United States Patent [19]

Newkirk et al.

[11] Patent Number: 5,073,527
[45] Date of Patent: Dec. 17, 1991

[54] SELF-SUPPORTING CERAMIC MATERIALS

[75] Inventors: Marc S. Newkirk, Newark, Del.; Harry R. Zwicker, Elkton, Md.

[73] Assignee: Lanxide Technology Company, LP, Newark, Del.

[21] Appl. No.: 462,329

[22] Filed: Mar. 28, 1990

Related U.S. Application Data

[60] Continuation of Ser. No. 256,256, Oct. 11, 1988, abandoned, which is a continuation of Ser. No. 50,829, May 15, 1987, abandoned, which is a division of Ser. No. 822,999, Jan. 27, 1986, abandoned, which is a continuation-in-part of Ser. No. 776,965, Sep. 17, 1985, abandoned, which is a continuation-in-part of Ser. No. 747,788, Jun. 25, 1985, abandoned, which is a continuation-in-part of Ser. No. 632,636, Jul. 20, 1984, abandoned.

[51] Int. Cl.$^5$ ............................................. C04B 35/10
[52] U.S. Cl. .................................. 501/127; 501/120; 501/128; 501/94
[58] Field of Search .................. 501/87, 88, 92, 94, 501/96, 98, 119, 127, 128; 264/65; 501/120

[56] References Cited

U.S. PATENT DOCUMENTS

| | | | |
|---|---|---|---|
| 2,741,822 | 4/1956 | Udy | 264/65 O |
| 3,108,887 | 10/1963 | Lenie | 501/98 X |
| 3,255,027 | 6/1966 | Talsma | 264/65 |
| 3,262,763 | 7/1966 | Bechtold | 501/98 X |
| 3,296,002 | 1/1967 | Hare | 501/80 O |
| 3,298,842 | 1/1967 | Suefert | 501/127 |
| 3,419,904 | 12/1968 | Mao | 501/98 X |
| 3,421,863 | 1/1969 | Bawa | 501/128 |
| 3,437,468 | 4/1967 | Suefert | 75/235 |
| 3,473,938 | 10/1969 | Oberlin | 264/65 |
| 3,473,987 | 10/1969 | Sowards | 501/119 |
| 3,538,231 | 11/1970 | Newkirk | 373/117 |
| 3,551,101 | 12/1970 | Matsuo et al. | 423/412 O |
| 3,649,310 | 3/1972 | Yates | 501/92 X |
| 3,669,695 | 6/1972 | Iler | 501/96 X |
| 3,789,096 | 1/1974 | Church | 264/60 O |
| 3,864,154 | 2/1975 | Gazza et al. | 264/60 X |
| 3,973,977 | 8/1976 | Wilson | 501/120 |
| 4,117,096 | 9/1978 | Hosaka et al. | 501/88 X |
| 4,240,835 | 12/1980 | Laskow et al. | 501/88 O |
| 4,478,785 | 10/1984 | Huseby et al. | 501/96 X |
| 4,486,543 | 12/1984 | Leimer et al. | 501/88 O |
| 4,495,122 | 1/1985 | Leiner et al. | 501/88 X |
| 4,591,537 | 5/1986 | Aldinger et al. | 501/96 X |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"–M. Drouzy and M. Richard–Mar., 1974–Fonderie, France No. 332, pp. 121–128.
"Refractories for Aluminum Alloy Melting Furnaces"–B. Clavaud and V. Jost–Sep., 1980–Lillian Brassinga (from French) Jan., 1985.

*Primary Examiner*—Karl Group
*Attorney, Agent, or Firm*—Mark G. Mortenson; William E. McShane

[57] ABSTRACT

A method to produce an article of commerce comprising a self-supporting ceramic body by oxidation of a molten parent metal with a vapor-phase oxidant, includes applying to a surface of the parent metal a layer having at least one dopant material therein. The layer is thin relative to the thickness of the ceramic body. Upon heating the parent metal to a molten state in the presence of the oxidant, e.g., air, an oxidation reaction product is formed on the molten metal which, because of the effect of the dopant material, migrates through the growing oxidation reaction product so as to be exposed to the oxidant to form additional oxidation reaction product to and beyond the depth of the applied dopant material layer. Suitable temperature and oxidizing conditions are maintained for a time sufficient to produce a self-supporting ceramic body.

3 Claims, 3 Drawing Sheets

SELF-SUPPORTING CERAMIC MATERIALS

CROSS-REFERENCE TO RELATED APPLICATIONS

This application is a continuation of copending application Ser. No. 07/256,256 filed on Oct. 11, 1988 now abandoned which is a continuation of copending application Ser. No. 050,829, filed on May 15, 1987, and now abandoned. U.S. application Ser. No. 050,829 was a divisional of copending application Ser. No. 822,999, filed Jan. 27, 1986. U.S. application Ser. No. 822,999, was abandoned in favor of continuation application Ser. No. 220,935, filed June 23, 1988, which was allowed on Nov. 17, 1988. U.S. application Ser. No. 822,999, was a continuation-in-part of the following commonly owned and copending U.S. patent applications: Ser. No. 776,965, filed Sept. 17, 1985, now abandoned, which was a continuation-in-part of Ser. No. 747,788, filed June 25, 1985, now abandoned, which was a continuation-in-part of Ser. No. 632,636 filed July 20, 1984, now abandoned, all in the name of Marc S. Newkirk, et al., and entitled "Methods of Making Self-Supporting Ceramic Materials".

BACKGROUND OF THE INVENTION

1. Field Of The Invention

The present invention broadly relates to novel methods of producing self-supporting ceramic materials and to the products thereof exhibiting superior properties as compared with conventional or known ceramic bodies. In its more specific aspects, this invention relates to methods of producing self-supporting ceramic bodies and products thereof from a parent metal by oxidation of the molten parent metal having applied to its surface one or more dopants, thereby resulting in a polycrystalline oxidation reaction product, useful as a ceramic material.

2. Background

Ceramics have, in recent years, been increasingly considered as candidates for structural applications historically served by metals. The impetus for this substitution has been the superior properties of ceramics, such as corrosion resistance, hardness, modulus of elasticity, and refractory capabilities when compared with metals, coupled with the fact that the engineering limits of performance of many modern components and systems are now gated by these properties in conventionally employed materials. Examples of areas for such prospective substitution include engine components, heat exchangers, cutting tools, bearings and wear surfaces, pumps, and marine hardware.

However, the key to enabling the substitution of ceramics for metals in such structural applications has been the cost-effective development of improved strength and fracture toughness characteristics sufficient to withstand tensile loading, vibration, and impact. Current efforts to produce high strength, reliable monolithic ceramics have focused upon improved powder processing technologies, and although these efforts have resulted in improvements in ceramic performance they are also complicated and generally less than cost-effective. The emphasis in such conventional powder processing technologies has been in two areas: 1) improved methods of producing ultra-fine, uniform powder materials using sol-gel, plasma, and laser techniques, and 2) improved methods of densification and compaction, including superior sintering techniques, hot pressing and hot isostatic pressing. The object of these efforts is to produce dense, fine-grained, flaw-free microstructures and, in fact some improvement in performance capabilities in ceramics has been attained in these areas. However, these developments have generally resulted in dramatic increases in the cost of producing ceramic structures.

One limitation in ceramic engineering which is aggravated by modern ceramic processing is scaling versatility. Conventional processes aimed at densification (i.e., removal of voids between powder particles) are incompatible with large, one-piece structural application possibilities for ceramics, such as monolithic furnace liners, pressure shells, boiler and superheater tubes, etc. Several practical problems are encountered in the conventional processing of ceramic parts with an increase in part size. The problems include, for example, increased process residence times, stringent requirements for uniform process conditions over a large process volume, cracking of parts due to non-uniform densification if conditions are not sufficiently uniform, excessive compaction forces and die wall thickness dimensions if hot pressing is used, and excessive pressure vessel costs due to internal volume and wall thickness requirements in the case of hot isostatic pressing.

Occasionally in the past, oxidation of metals has been contemplated as a conceptually attractive approach to the formation of an oxide-type ceramic body. In this regard, it may be noted that metals oxidize generally in one of four modes. Certain metals oxidize when exposed to an oxidizing environment to form an oxidation reaction product which flakes, spalls or is porous, such that the metal surface is continually exposed to the oxidizing environment. In such a process, a free-standing or self-supporting body is not formed as the metal oxidizes, but rather, a mass of flakes or particles is formed. Iron, for example, reacts with oxygen so as to oxidize in such a manner. Certain other metals such as aluminum, magnesium, chromium, nickel or the like oxidize in such a manner as to form a relatively thin, protective oxidation reaction product skin which transports either oxidant or metal (or both) at such a low rate that the underlying metal is effectively protected from further oxidation. This mechanism does not yield a free-standing structure of a thickness sufficient to exhibit any significant structural integrity. Still other metals are known to form a solid or liquid oxidation reaction product film which does not protect the underlying parent metal because such reaction products permit the transport of oxidant therethrough. While an oxygen-permeable film may retard the oxidation rate of the underlying metal, the metal itself is not totally protected by the film due to oxidant-permeability thereof. An example of this latter type of oxidation occurs in the case of silicon which, when exposed to air at elevated temperatures, forms a glassy skin of silicon dioxide which is permeable to oxygen. Typically, these processes do not occur at nearly fast enough rates to produce a useful thickness of ceramic material. Finally, other metals form oxidation reaction products which volatize and continually expose fresh metal to oxidation. Tungsten is an example of a metal which oxidizes in this manner when reacted with oxygen at high temperatures to form $WO_3$.

In an attempt to produce thicker ceramic oxide layers, fluxes have been added to the surfaces of metals such as aluminum and magnesium to dissolve or break up their oxides and render them susceptible to oxygen or metal transport so that thicker oxide skins can be produced. However, the ability to form free-standing ceramic structures by such a technique has heretofore been limited to thin sections of relatively limited strength.

The prior art shows the use of fluxes on metal powders to dissolve or break up their oxidation reaction products to facilitate oxidation of their surfaces in admixture with other particulates to yield intrinsically porous, low strength ceramics, as described in U.S. Pat. No. 3,255,027 to H. Talsma and U.S. Pat. No. 3,299,002 to W. A. Hare. Similar methods may be used to produce thin-walled $Al_2O_3$ refractory structures (U.S. Pat. No. 3,473,987 to D. R. Sowards and U.S. Pat. No. 3,473,938 to R. E. Oberlin) or thin walled hollow refractory particles (U.S. Pat. No. 3,298,842 to L. E. Seufert). However, a characteristic of such processes is the limited thickness of oxidation reaction product which is formed, apparently because the effect of a fluxing agent is of relatively short duration such that the oxidation reaction product reverts to a slow-growing, protective character after only a limited amount of growth. Increasing the flux concentration to promote thicker ceramic skin growth results in a lower strength, less refractory, lower hardness product and, therefore, is counter-productive.

One technique which has been successfully employed to create freestanding ceramics by the oxidation of metals involves an oxidation/reduction or "redox" type reaction. It has long been known that certain metals will reduce other metal oxides to form a new oxide and, also, a reduced form of the original oxide. The use of such redox-type reactions to produce ceramic materials is described in U.S. Pat. No. 3,437,468 to L. E. Seufert and U.S. Pat. No. 3,973,977 to L. E. Wilson. The primary disadvantage of the redox-type reactions described in these patents is their inability to produce a singular, hard, refractory oxide phase as a reaction product, but rather the products contain multiple oxide phases which degrade the hardness, modulus of rupture and wear resistance characteristics.

Description of Commonly Owned Related Applications

The subject matter of this application is related to that of copending and commonly owned U.S. Pat. No. 4,713,360, which issued on Dec. 15, 1987 from application Ser. No. 181,943, filed Jan. 15, 1986, now abandoned which was a continuation-in-part of Ser. No. 776,964, filed Sept. 17, 1985, now abandoned which was a continuation-in-part of Ser. No. 705,787 filed Feb. 26, 1985, now abandoned which was a continuation-in-part of Ser. No. 591,392, filed Mar. 16, 1984, now abandoned all in the names of Marc S. Newkirk et al. and entitled "Novel Ceramic Materials and Methods of Making Same". These Applications, the entire disclosures of which are expressly incorporated herein by reference, disclose a novel method for producing a self-supporting ceramic body by oxidation of a molten parent metal to form a polycrystalline material consisting essentially of the oxidation reaction product of said parent metal with a vapor-phase oxidant and, optionally, one or more non-oxidized constituents of the parent metal. The term "ceramic" as used therein and in this specification and the appended claims is not limited to a ceramic body in the classical sense, that is, in the sense that it consists entirely of non-metallic and inorganic materials but, rather, it refers to a body which is predominantly ceramic with respect to either composition or dominant properties, although the body may contain minor or substantial amounts of one or more metals derived from the parent metal most typically within a range of from about 1–40% by volume, but may include still more metal. The term "parent metal" as used therein and in this specification and the appended claims refers to that metal, e.g., aluminum, which is the precursor for the polycrystalline oxidation reaction product, and includes that metal or a relatively pure metal, a commercially available metal having impurities and/or alloying constituents therein, and an alloy in which that metal precursor is the major constituent, and when a specific metal is mentioned as the parent metal, e.g., aluminum, the metal identified should be read with this definition in mind unless indicated otherwise by the context.

The parent metal, which is the precursor to the oxidation reaction product, is formed into an ingot, billet, rod, plate, or the like, and placed in an inert bed, crucible or other refractory container, with one or more of the metal surfaces exposed to a vapor-phase oxidizing environment. The metal is heated above its melting point but below the melting point of the oxidation reaction product, but it should be understood that the operable range or preferred temperatures may not extend over this entire temperature interval. At this temperature, or within this temperature range, a body or pool of molten metal forms, and on contact with the oxidant, the molten metal will react to form a layer of oxidation reaction product. Upon continued exposure to the oxidizing environment, the remaining molten metal is progressively drawn into and through the oxidation reaction product in the direction of the oxidant so as to cause continued growth of the polycrystalline oxidation reaction product at or near the solid-vapor interface. The resulting product produced by the oxidation of the parent metal. It should be understood that the resulting consists essentially of the oxidation reaction product of the parent metal with the vapor-phase oxidant and, optionally, one or more non-oxidized constituents of the parent metal It should be understood that the resulting polycrystalline material may exhibit porosity which may be a partial or nearly complete replacement of the metal phase, but the volume percent of voids will depend largely on such conditions as temperature, time, and type of parent metal. Typically in these polycrystalline ceramic structures, the reaction product crystallites are interconnected, preferably in three dimensions, and the metal and/or voids may be at least partially interconnected.

By way of explanation of the oxidation process but not wishing to be bound thereby, the molten metal is transported along channels at certain high energy grain intersections of the oxidation reaction product phase. It is well understood that any polycrystalline material exhibits a range of grain boundary energies (surface free energies) depending upon the degree of lattice misalignment at the interface between two adjacent crystals or grains of the same material. In general, grain boundaries of low angular misalignment exhibit low surface energies, while high angle boundaries have high surface energies, although the relationship may not be a simple, monotonically increasing function of the angle due to the occasional occurrence of more favorable atomic alignments at intermediate angles. Similarly, the lines along which three grains intersect also typically are high energy features in a polycrystalline microstructure.

As further explained in the aforesaid commonly owned Patent Applications, but not wishing to be bound thereby, the parent metal and oxidant apparently form a favorable polycrystalline oxidation reaction product having a surface free energy relationship with the molten parent metal such that within some portion of a temperature region in which the parent metal is molten, at least some of the grain intersections (i.e., grain boundaries or three-grain-intersections) of said polycrystalline oxidation reaction product are replaced by planar or linear channels of molten metal. For example, consider a grain boundary having a surface free energy greater than the alternative configuration of two substantially geometrically equivalent crystal/molten metal interface boundaries. In these circumstances, such a high energy grain boundary either will not form or will spontaneously decompose in favor of a planar channel of molten metal bounded by two crystal/metal interfaces. When the molten metal is maintained in the oxidizing environment and within the effective portion of the temperature region, molten metal is drawn or transported along such channels in the direction of the oxidant. More specifically, this phenomenon occurs when (1) the liquid metal wets the crystallite phase (i.e., $\gamma_{SL} < \gamma_{SG}$, where $\gamma_{SL}$ denotes the surface free energy crystal/molten metal interface and $\gamma_{SG}$ denotes the surface free energy of the crystal/vapor interface), and (2) the energy of some of the grain boundaries, $\gamma_B$, is greater than twice the crystal/liquid metal interfacial energy, i.e., $\gamma_{BMAX} > 2\gamma_{SL}$ where $\gamma_{BMAX}$ is the maximum grain boundary energy of the polycrystalline material. Molten metal channels of linear character can be formed in a similar way if metal replaces some or all of the three-grain-intersections in the material.

Since the channels are at least partially interconnected, (i.e., the grain boundaries of the polycrystalline material are interconnected), molten metal is transported through the polycrystalline oxidation reaction product to its surface into contact with the oxidizing atmosphere, where the metal undergoes oxidation resulting in the continual growth of the oxidation reaction product. Furthermore, since the wicking of molten metal along channels is a much faster transport process than the ionic conduction mechanisms of most normal oxidation phenomena, the growth rate observed for the oxidation reaction product with this oxidation process is much faster than that typically observed in other oxidation phenomena.

While the oxidation reaction product of the present invention is interpenetrated by metal along high energy grain intersections, the polycrystalline reaction product phase is itself interconnected in one or more dimensions, preferably in three dimensions, along relatively low angle grain boundaries which do not meet the criterion $\gamma_B > 2\gamma_{SL}$. Thus, the product of this invention exhibits many of the desirable properties of the classical ceramic (i.e., hardness, refractoriness, wear resistance, etc.) while deriving additional benefits from the presence of the distributed metal phase (notably higher toughness and resistance to fracture).

As described in the aforesaid commonly owned patent applications, certain parent metals under a specific set of conditions of temperature and oxidant atmosphere meet the oxidation phenomenon of the invention with no special additions or modifications. However, alloying of dopant materials with the parent metal can favorably influence or promote the oxidation reaction process.

Although the present invention is hereinafter described with particular emphasis on aluminum and specific embodiments of aluminum as the parent metal, this reference is for exemplary purposes only, and it is to be understood that other metals such as silicon, titanium, tin, zirconium, etc., also can be employed which meet the criteria of the invention. Usually, the resulting predominantly ceramic body will contain therein inclusions of non-oxidized constituents of the parent metal drawn through the polycrystalline material and solidified therein as the ceramic body cooled after termination of the growth process.

SUMMARY OF THE INVENTION

Generally, the method of this invention by which self-supporting ceramic materials are formed is based upon the discovery that the distinctly novel and surprising oxidation reaction behavior of a parent metal as described in the aforesaid Commonly Owned Patent Applications can be enhanced by externally selectively doping (as shall be hereinafter described) all or only selected portions of the surface of said parent metal In other words, it has been found that it is not necessary to alloy the dopant material into the parent metal. Selectively applying one or more dopant materials in a thin layer to a surface of the parent metal locally induces the metal transport and ceramic growth phenomenon as fully described in the aforesaid commonly owned patent applications. Useful dopant materials, as exemplified in the aforesaid commonly owned patent applications and referenced specifically to aluminum oxidized in air, include a source of one or more of magnesium, zinc, silicon, lead, tin, germanium, sodium, lithium, calcium, boron, phosphorus, yttrium, and one or more rare earth elements, and mixtures thereof. The dopant may be either in the elemental form or as part of a compound, preferably the latter such as MgO or $SiO_2$. The present invention thus relates to the production of the same genre of ceramic materials disclosed in the aforesaid commonly owned patent applications by applying a relatively thin layer of dopant material(s) to achieve the oxidation behavior and resultant growth of ceramic materials.

This discovery offers certain advantages; for example, ceramic growth can be achieved in one or more selected areas of the parent metal's surface rather than indiscriminately, making the process more efficiently applied, for example, to the growth of ceramic plates by applying a layer of at least one dopant material to one or more selected portions of the parent metal. Further, the present invention obviates the need for alloying the dopant material into the parent metal, thereby rendering the process feasible for application to commercially available wrought metals and alloys which otherwise would not contain or have appropriately doped compositions.

In accordance with the present invention there is provided a method for producing a self-supporting ceramic body by oxidation of a parent metal, e.g., aluminum, to form a polycrystalline material consisting essentially of (1) the oxidation reaction product of the parent metal with a vaporphase oxidant and, optionally, (2) one or more non-oxidized constituents of the parent metal. A layer of dopant material is applied to a least a portion of the surface of a parent metal to provide thereon a dopant-carrying surface. The parent metal is heated to a temperature above its melting point, but below the melting point of the oxidation reaction product, to form a body of molten parent metal which is reacted at the aforesaid temperature, or within the range, by initially contacting the dopant-carrying surface thereof with the oxidant, e.g., air, to form the oxidation reaction product. It should be understood that the temperatures or preferred range can vary depending upon such factors as parent metal, dopant, time of reaction, and oxidant. At least a portion of the oxidation reaction product is maintained in contact with and extends between the body of molten metal and the oxidant, and molten metal is drawn through the polycrystalline material towards the oxidant such that oxidation reaction product continues to form at the interface between the oxidant and previously formed oxidation reaction product, and grows to substantially beyond the depth of the applied layer of dopant material. The reaction is continued for a time sufficient to produce the ceramic body.

As used in this specification and in the appended claims, "oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or more metals with an oxidant such as oxygen, nitrogen, a halogen, sulphur, phosphorus, arsenic, carbon, boron, selenium, tellurium and compounds and combinations thereof, for example, methane, ethane, propane, acetylene, ethylene, propylene, and mixtures such as air, $H_2/H_2O$ and $CO/CO_2$, the latter two (i.e., H and CO/$CO_2$) being useful in reducing the oxygen activity of the environment. As used herein and in the claims, reference to an "oxidant", "vapor-phase oxidant" or the like, which identifies the oxidant as containing or comprising a particular gas or vapor, means an oxidant in which the identified gas or vapor is the sole, predominant or at least a significant oxidizer of the parent metal under the conditions obtained in the oxidizing environment utilized. For example, although the major constituent of air is nitrogen, the oxygen content of air is normally the sole or predominant oxidizer for the parent metal because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant as used herein and in the claims is "forming gas", which contains predominantly nitrogen and a minor portion of hydrogen, typically about 96 volume percent nitrogen and 4 volume percent hydrogen.

The addition of dopant materials to the parent metal favorably influences or promotes the oxidation reaction process. While not wishing to be bound by any particular theory or explanation of the function of the dopant, it appears that the dopant or dopants will tend to promote or accelerate the development of a polycrystalline structure formed upon oxidation of the metal into one containing channels for molten metal transport, as required for the new process Another function of the dopant materials may be to initiate the ceramic growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth phenomenon of the present invention, but such dopants may be important in reducing any incubation period for the initiation of such growth to within commercially practical limits for certain parent metal systems It should be understood, however, that whether a particular dopant enables, accelerates, or initiates the growth phenomenon, its function or functions can depend upon a number of factors other than the dopant material itself. These factors include, for example, the particular parent metal, the end product desired, the particular combination when two or more dopants are used, the oxidation environment, and the process conditions. Still further, certain dopants appear to have a dual function which can vary depending upon these different factors. Although the present invention attempts to explain the roles of these dopants, and certain preferred embodiments are described below with this explanation in mind, it should be recognized that the precise behavior may not be completely understood, and the performance or function of any one dopant can vary depending upon the circumstances.

The materials of this invention can be grown with substantially uniform properties throughout their cross-section to a thickness heretofore difficult to achieve by conventional processes for producing dense ceramic structures. The process which yields these materials also obviates the high costs associated with fine uniform powder preparation, green body forming, binder burnout, and densification by sintering, hot pressing and hot isostatic pressing. The products of the present invention are adaptable or fabricated for use as articles of commerce such as by machining, grinding, polishing, etc., which, as used herein, is intended to include, without limitation, industrial, structural and technical ceramic bodies for such applications where electrical, wear, thermal, structural or other features or properties are important or beneficial; and is not intended to include recycle or waste materials such as might be produced as unwanted by-products in the processing of molten metals. Such ceramic bodies include, for example, engine components, heat exchangers, kiln furniture, cutting tools, abrasives, valve components, pump components, bearings, seals, dies, diffusion tubes, mufflers, tiles, radiation barriers, etc.

Other products obtainable by the practice of the present invention are described in the section below entitled "Description Of The Invention Including Preferred Embodiments".

DESCRIPTION OF THE INVENTION INCLUDING PREFERRED EMBODIMENTS

Figure 1:
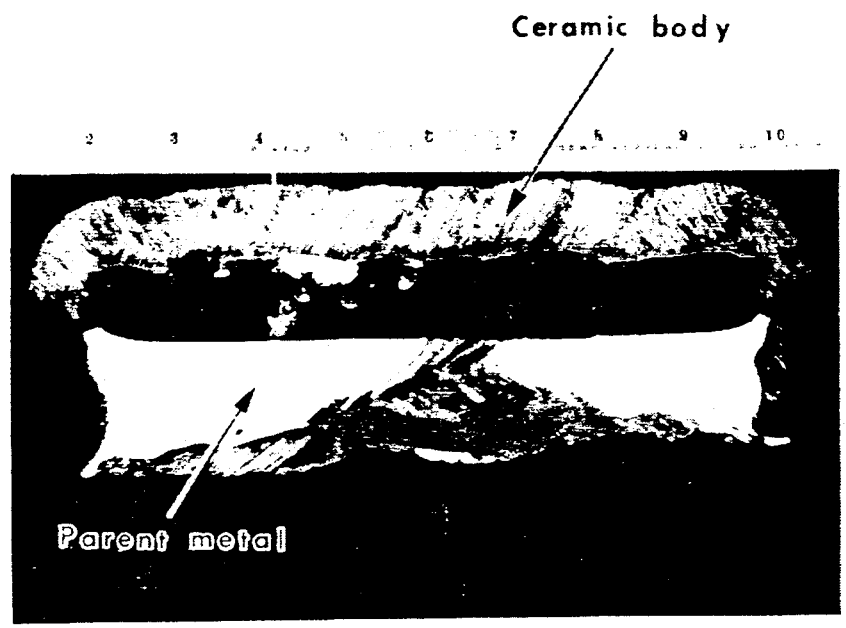
FIG. 1 is a photograph of a section of a ceramic body produced in accordance with Example 8 of this application.

In the present invention, a parent metal is selectively doped by applying a layer of one or more dopant materials to either all, or a portion of, its surface. For example, such layer may be applied by painting, dipping, silk screening, evaporating, or otherwise applying the dopant material in liquid or paste form, or by sputtering a dopant or by simply depositing a layer of a dopant or a thin sheet or film of dopant onto the surface of the parent metal. The dopant material may, but need not, include either organic or inorganic binders, vehicles, solvents, thickeners, etc. The doped parent metal is then exposed to an oxidizing environment, above the melting point of the parent metal and below the melting point of the oxidation reaction product Under such process conditions, the liquid or molten parent metal undergoes oxidation from its surface outwardly, progressing toward the oxidizing atmosphere by wicking along channels which are believed to form in place of high energy grain intersections in the otherwise impermeable oxidation reaction product structure. New material is continually formed by reaction of the liquid metal with the oxidant, for example, an oxidizing vapor or atmosphere, thus "growing" a ceramic structure to substantially beyond the depth of the surface-applied dopant layer. The ceramic structure is the oxidation reaction product of the metal and the oxidant, and is interconnected in one or more dimensions, preferably in three dimensions, apparently along low energy grain boundaries. The resulting material optionally may contain inclusions of some or all of the constituents of the parent metal dispersed in metallic, i.e., non-oxidized, form throughout the microstructure in either interconnected or isolated arrangement.

The materials of this invention, like those of the aforesaid commonly owned patent applications, can be grown with substantially uniform properties tailored for specific applications to thicknesses heretofore unachievable by conventional processes for producing dense ceramic structures. The process which yields these materials also obviates the high costs associated with fine uniform powder preparation and processing techniques, characteristic of conventional ceramic production methods. The present invention is concerned with an improved technique for overcoming these difficulties by producing dense, high strength and fracture-tough ceramic microstructures by a mechanism which is more direct and less expensive than conventional approaches. The present invention also provides improved means for reliably producing oxidation reaction-derived ceramics of a size and thickness which are difficult to duplicate with conventional technology.

The process of this invention concerns an improved method of applying a dopant material to a parent metal to facilitate taking advantage of certain conditions capable of producing the oxidation reaction behavior of a metal as disclosed in the aforesaid commonly owned patent applications. Thus, the present invention involves a novel technique for promoting an unusual oxidation phenomenon which facilitates overcoming the difficulties and limitations of prior processes for making ceramics.

The present invention obviates the need for alloying the dopant materials into the parent metal prior to processing, and thus presents a distinct advantage with respect to processing costs and techniques. That is, with the present invention, there no longer exists the need to initially alloy a parent metal with the requisite amounts of dopant materials. The elimination of the processing steps which are necessary to alloy a parent metal with the dopant material provides significant economies. Moreover, significantly less dopant material is needed to achieve the oxidation and growth phenomena as described in the aforesaid commonly owned patent applications when such dopant materials are surface-applied to the parent metal in accordance with the present invention, as compared to alloying the dopant material in the parent metal body. As noted above, the method of the present invention also lends itself to growth of the ceramic structure in selected areas by localized placement of the dopant material on a surface of the parent metal. Thus, the present invention provides a method aspect whereby the growth of the ceramic material can be controlled in dependence upon the localized placement of the dopant material upon the parent metal surface. The applied coating or layer of dopant is thin relative to the thickness of the parent metal body and growth or formation of the oxidation reaction product extends substantially beyond the dopant layer, i.e., to beyond the depth of the applied dopant layer.

Useful dopants for an aluminum parent metal, particularly with air as the oxidant, include, for example, magnesium and zinc, either singly or in combination with each other or together in combination with other dopant(s) described below. One or more or all of these dopants, or one or more or all of suitable sources of these dopants, are applied externally to the aluminum-based parent metal either in elemental form or more preferably as a compound, e.g., MgO or ZnO. Zinc, if applied as an external dopant to aluminum, may not require the presence of magnesium to operate the process of the present invention effectively.

Other dopants which are effective in promoting polycrystalline oxidation reaction product growth for aluminum-based parent metal systems are, for example, silicon, germanium, tin and lead, especially when used in combination with magnesium or zinc. One or more of the other dopants or a suitable source of the dopant, is applied externally to the parent metal and, optionally, one or more of the remaining dopants or sources thereof is alloyed into the aluminum parent metal system.

Additional examples of dopant materials useful with aluminum parent metal, include sodium, lithium, calcium, boron, phosphorus and yttrium, which may be used individually or in combination with one or more other dopants depending on the oxidant and process conditions. Sodium and lithium may be used in very small amounts, even in parts per million range, as low as about 100–200 parts per million, and each may be used alone or together, or in combination with other dopant(s). Rare earth elements such as cerium, lanthanum, praseodymium, neodymium and samarium are also useful as dopants, and here again especially when used in combination with other dopants.

As noted above, it is not necessary that all of the dopants be applied to an external surface of the parent metal. Thus, one or more of the dopants may be internally alloyed with or otherwise incorporated into the parent metal, and the other dopant or dopants may be externally applied dopants. For example, concentration dance with the present invention. Additionally, dopants alloyed within the parent metal may be augmented by externally applied dopants For example, concentration deficiencies of one or both of internal or alloyed dopants may be augmented by externally applied dopants. In the case of aluminum, there may be no common commercially available alloys which are optimally constituted with respect to internally alloyed concentrations of materials which may serve as dopant materials. It has been found that such alloys may be used by externally applying selected dopant(s) to a surface of such metal.

Preferably, the dopant materials are applied to a portion of a surface of the parent metal as a uniform coating thereon which is thin relative to the thickness of the body of parent metal to which it is applied. The quantity of dopant is effective over a wide range relative to the amount of parent metal to which it is applied and, in the case of aluminum, experiments have established a wide range of operable limits. For example, when utilizing silicon in the form of silicon dioxide as a dopant for an aluminum-based parent metal using air or oxygen as the oxidant, quantities as low as about 0.00003 gram of silicon per gram of parent metal, or about 0.0001 gram of silicon per square centimeter of exposed parent metal surface, together with a second dopant such as a magnesium source produce the ceramic structure growth phenomenon. It has also been found that a ceramic structure is achievable from an aluminum-based parent metal containing silicon using air as the oxidant, by applying to the surface MgO dopant in an amount greater than about 0.0008 gram Mg per gram of parent metal to be oxidized and greater than about 0.003 gram Mg per square centimeter of parent metal surface upon which the MgO is applied.

In the case of employing a body of molten aluminum or its alloys as the parent metal and air or oxygen as the oxidant in the process of the present invention, the appropriate amounts of dopant(s) are applied to at least a portion of a surface of the parent metal, and the parent metal is then placed in a crucible or other refractory container with the metal surface exposed to an oxidizing atmosphere. The parent metal is then heated in a furnace to a temperature in the region typically between about 850° C. to about 1450° C., or preferably, between about 900° C. to about 1350° C., to melt the parent metal. An oxide film forms on the surface of the parent metal and migration of the molten metal through the oxide film occurs. The continued exposure of the molten parent metal to the oxidant allows the formation of a polycrystalline oxidation reaction structure of increasing thickness exhibiting a microfine network of parent metal in the oxidation reaction product thus formed. The polycrystalline reaction product is interconnected in one or more dimensions, preferably in three dimensions, and the metal phase is also interconnected in one or more dimensions. When the process is continued after the consumption of the original metal pool, interconnected metal within the microstructure is transported to the surface to form additional oxide, leaving interconnected porosity in place of the metal. Reaction product grows at a substantially constant rate (that is, substantially constant thickness growth rate over time), provided sufficient air (or other oxidant atmosphere) replacement is allowed in the furnace to keep a relatively constant source of oxidant therein. Replacement of oxidant atmosphere, in the case of air, can be conveniently provided by vents in the furnace. Growth continues until at least one of the following occurs: 1) the parent metal has been converted into the polycrystalline oxidation reaction product material, i.e., substantially all of the parent metal is consumed; 2) the oxidizing atmosphere has been exhausted, depleted, evacuated or replaced by a non-oxidizing atmosphere, or 3) the reaction temperature is altered to be outside the reaction temperature envelope, e.g., lowered below the melting point of the parent metal. Usually, the temperature is reduced by lowering the furnace temperature, and then the material is removed from the furnace.

Preferably, the dopant materials are applied as powders to the surface of the parent metal. One particularly preferred method of applying the dopants to the parent metal surface is to utilize a liquid suspension of the dopants in a water/organic binder mixture sprayed or otherwise applied onto the parent metal surface, followed optionally by drying, in order to obtain an adherent coating which facilitates handling of the doped parent metal prior to processing.

It also has been discovered that the source of dopant can be provided by placing a rigid body consisting essentially of the dopant material, in contact with at least a portion of the parent metal surface. For example, a thin sheet of silicon-containing material can be placed upon a surface of an aluminum parent metal onto which another dopant, e.g., magnesium, had been previously applied. When the material-overlaid parent metal is melted in an oxidizing environment (e.g., in the case of aluminum in air, between about 850° C. to about 1450° C.), growth of the ceramic body occurs.

Generally, in one embodiment, the polycrystalline ceramic bodies produced according to this invention are characterized by a microfine network of metal. This metal appears to be along what would otherwise constitute high energy grain intersections. The polycrystalline oxidation reaction product phase is highly interconnected in one or more dimensions, preferably in three dimensions. The metal phase is also interconnected, at least to a certain extent, but the metal is not required as a binder for the crystallites which are bonded directly to one another. When the process is taken to completion, that is, when the metal phase has been completely oxidized or nearly completely oxidized, the interconnected metal constituent is drawn from the body leaving porosity in its place to form additional ceramic on the surface.

The present invention makes it possible to produce a nearly void-free ceramic product, and usually if the process is not conducted beyond the exhaustion of the parent metal, the product obtained is nearly fully dense. If the process is taken to completion in that the parent metal has been exhausted and the metallic phase initially formed in the ceramic body is nearly completely oxidized, the product will exhibit a higher volume percent of voids which are at least partially interconnected. For example, a ceramic body formed from aluminum doped with magnesium and silicon and processed in air at about 1125° C. may contain about 20-30 volume percent metal and about 2-5 volume percent voids when growth is stopped before all the metal is oxidized; and if processed to oxidize nearly all the metal, may contain about 1-3 volume percent parent metal and 25-30 volume percent voids when the process is run to completion.

In accordance with another aspect of the present invention there is provided a self-supporting ceramic body adapted or fabricated for use as an article of commerce which is formed upon melting a parent metal precursor having a layer of dopant material applied to at least a portion of its surface, and oxidizing the resultant molten parent metal precursor with a vapor-phase oxidant. The resultant ceramic body comprises an essentially single phase polycrystalline oxidation reaction product and metal channels or voids or both, and is characterized by crystal lattice misalignments at oxidation reaction product crystallite grain boundaries which are less than the lattice misalignments between those neighboring oxidation reaction product crystallites having metal channels or voids, or both, disposed between them.

The ceramic body of this invention, formed upon oxidation of an externally-doped parent metal precursor with a vapor-phase oxidant, comprises a polycrystalline oxidation reaction product of a metal precursor, and is characterized by an essentially single phase ceramic skeletal structure (the oxidation reaction product) and one or more non-oxidized constituents of the metal precursor or voids or both. The individual crystallites of the ceramic skeletal structures are, in certain embodiments, interconnected through low angle grain boundaries having an angular mismatch between adjacent crystal lattices of less than about 5 degrees. Metal channels are formed when high misorientation between the crystal lattices of adjacent grains has occurred.

In certain embodiments of this invention, the product exhibits a predominance of substantially arcuate interface boundaries between crystallites and non-oxidized metal or between crystallites and voids, or both, in that they weave or form a tortuous microstructure through the network. In single phase ceramic materials of the prior art, interfaces are substantially faceted, that, is, more angular and ragged. A product having a predominance of arcuate or rounded interface boundaries, as in the product of the present invention, may be particularly advantageous for certain applications because one would expect a lower degree of stress concentration and a lower elastic modulus than from a typical interconnected ceramic structure that did not have this type of arcuate structure.

The ceramic products of the present invention typically have an essentially single phase, interconnected, ceramic skeletal structure wherein the grain boundaries at the interconnection of the crystallites have no other phase present. The formation of such ceramic products by sintering is either difficult or impossible because impurities in a sintering process tend to be deposited at grain boundaries. Such impurities may be present either unintentionally or as deliberate additions to promote sintering or to restrict grain growth during high temperature processing. The absence of extraneous grain boundary phases in a product of this character is significant because it affords superior properties such as high temperature strength retention and creep resistance. Still further, the materials exhibit the property of intragranular fracture, that is, an intragranular fracture mode, which is in sharp contrast to dense sintered alumina, for example, where fracture is intergranular. Intragranular fracture occurs because the bonds between grains are as strong as the grains themselves, and is indicative of the superior character of the class of materials of the present invention.

Figure 4:
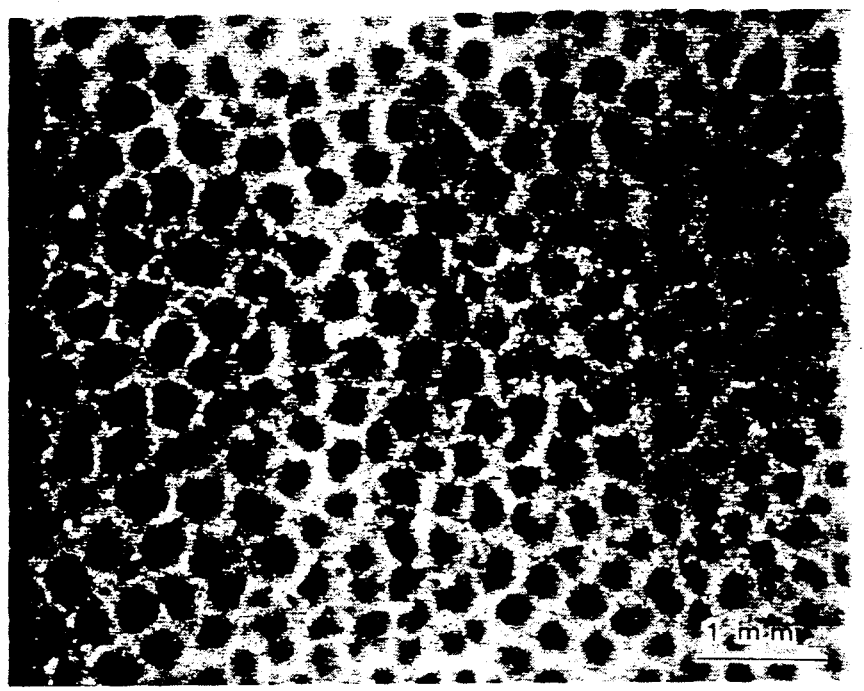
FIG. 4 is a photomicrograph of a cross section of the columnar microstructure of an alumina ceramic showing the hexagonal pattern typical of the columnar structure of material produced in accordance with Example 11 of this application.
Figure 5:
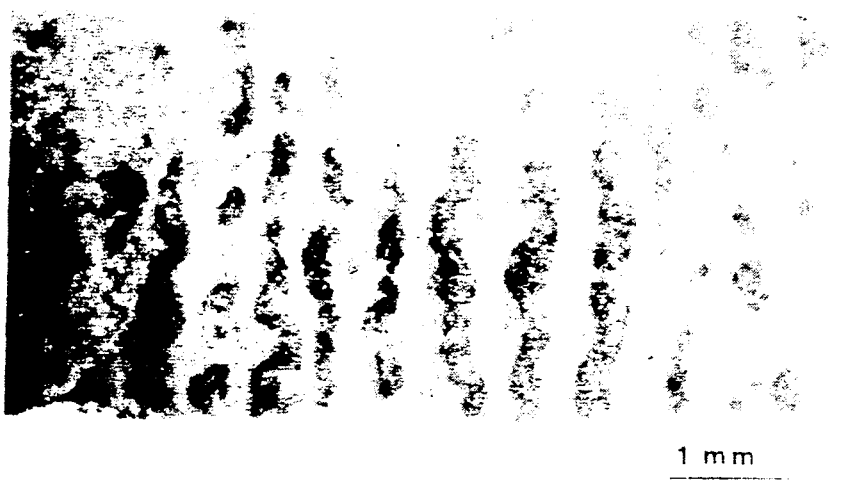
FIG. 5 is a photomicrograph of a cross section substantially perpendicular to the cross section of FIG. 4, showing the columnar structure of the material.

In one embodiment, the product of this invention is characterized by a substantially columnar macrostructure having a substantially hexagonal cellular pattern substantially normal to the longitudinal (vertical) axes of the columns of the columnar macrostructure (see FIG. 4). If the metallic phase has not been exhausted from the ceramic product, it is the ceramic regions with interconnected metal that form the boundaries of the hexagonal columns; but if the growth process is conducted to completion, the interconnected metal is exhausted from the boundaries of the hexagonal columns, leaving behind porosity. This macrostructure is the result of the directed growth phenomenon of this invention which provides for the interconnectivity of the metal phase or voids. This interconnectivity can be of value in that it may enhance certain properties of the ceramic product such as electrical or thermal conductivity.

The following non-limiting examples further exemplify the method of the present invention. Each example below uses air as the vapor-phase oxidant at ambient pressure supplied by convection through a furnace vent. The concentrations of all elements and compounds are stated in a percent by weight relationship and nominal compositions only are given for the alloying constituents.

EXAMPLE 1

In each trial, sheets of commercially available 1100 aluminum alloy two inches wide by nine inches long by approximately three-sixteenths of an inch thick and weighing approximately 100 grams each were separately embedded in a particulate bed of aluminum oxide (El Alundum, of 90 mesh size, supplied by Norton Company). El Alundum is a refractory aluminum oxide which is incompatible or inert with molten aluminum in that the molten aluminum will not penetrate or wet the Alundum particles under the process conditions. Each aluminum sheet was embedded in the Alundum with a nine inch by two inch face of the sheet exposed and substantially flush with the surface of the bed. The exposed surface was covered with one gram of finely divided magnesium oxide powder (0.0052 gram Mg per square centimeter or 0.0015 gram Mg per gram of parent aluminum) followed by one gram of silicon dioxide powder so as to uniformly cover the surface.

For each trial, the nominal cycle in a furnace configured to allow entry of atmospheric air was as follows:

| Elapsed Time (Period) | Temperature |
| --- | --- |
| 0–5 hours (5 hours) | From 30° C. to setpoint temperature |
| 5–29 hours (24 hours) | At setpoint temperature |
| 29–34 hours (5 hours) | From setpoint to about 600° C. |
| 34+ hours | Removed from furnace, 600° C. to ambient temp. |

The various samples were visually examined and weighed for weight gain measurement of the total crucible and load. As used herein, "weight gain ratio" is meant to refer to the ratio of the total change in weight of the refractory vessel/aluminum oxide bed/parent metal aluminum sheet caused by subjecting it to the furnace cycle noted above, divided by the original weight of the parent metal aluminum sheet.

The weight gain ratio for each test was compared against the theoretical maximum of 0.89 for yield efficiency of converting aluminum to alpha-alumina. X-ray diffraction analyses confirmed that the oxidation reaction product obtained from the aluminum was alpha-alumina with the exception of a thin spinel layer formed at the growth initiation surface. The results of this study are listed in Table 1. All ratios indicate the yield of alpha-alumina, uncorrected for other possible effects such as formation of alumina by reduction of the dopant oxides (which would not appear as a weight change), and small differences due to adsorption/desorption of moisture from the bed particle surfaces.

TABLE 1

Weight Gain Ratios At Various Setpoint Temperatures (Surface-applied Magnesium Oxide Layer Followed By Silicon Dioxide Layer)

| Setpoint Temperature | Weight Gain Ratio | Setpoint Temperature | Weight Gain Ratio |
|---|---|---|---|
| 1110° C. | 0.00 | 1300° C. | 0.44 |
| 1125° C. | 0.00 | 1325° C. | 0.27 |
| 1150° C. | 0.15 | 1350° C. | 0.34 |
| 1175° C. | 0.57 | 1375° C. | 0.13 |
| 1200° C. | 0.68 | 1400° C. | 0.19 |
| 1225° C. | 0.46 | 1425° C. | 0.14 |
| 1275° C. | 0.56 | — | — |

The results reported in Table 1 show significant weight gains demonstrating extensive oxidation of aluminum as the parent metal to aluminum oxide. These runs demonstrate the usefulness of the applied dopant layer, as confirmed by the control experiments in Example 4.

EXAMPLE 2

To determine whether the order of placement of magnesium oxide and silicon dioxide dopant materials on the exposed surface altered in a substantial way the forming of the ceramic body of the present invention, experiments were conducted in accordance with Example 1 but in which the silicon dioxide was applied first to the exposed surface of the parent metal plate, followed by the application of magnesium oxide. The resulting ceramic bodies were substantially identical to those of the previously described series of Example 1, and corresponding weight gains were as tabulated in Table 2 below.

TABLE 2

Weight Gain Ratios at Various Setpoint Temperatures (Silicon Dioxide Layer Followed By Magnesium Oxide Layer)

| Setpoint Temperature | Weight Gain Ratio |
|---|---|
| 1100° C. | 0.00 |
| 1150° C. | 0.04 |
| 1200° C. | 0.55 |
| 1250° C. | 0.53 |
| 1300° C. | 0.39 |
| 1350° C. | 0.20 |

As with the results reported in Table 1, significant weight gains demonstrate extensive oxidation of aluminum to aluminum oxide, and further show the irrelevance of the order in which the dopants are applied to the metal surface.

EXAMPLE 3

To determine if application of a binary dopant system as a single, pre-mixed layer on the surface of the parent metal would allow formation of a ceramic body, two grams of a 1:1 mixture by weight of the same magnesium oxide and silicon dioxide materials used in Example 1 were applied to the parent metal surface in a quantity of individual dopant materials identical to that described in Example 1, by applying the mixture to the exposed surface of the parent metal in the manner in which the individual materials were applied in Example 1. The weight gain ratios of this Example are given in Table 3 and show values corresponding to those of Examples 1 and 2, indicating that mixing the two dopants was also effective.

TABLE 3

Weight Gain Ratios at Various Setpoint Temperatures (Pre-mixed Magnesium Oxide-Silicon Dioxide Dopant Material)

| Setpoint Temperature | Weight Gain Ratio |
|---|---|
| 1200° C. | 0.75 |
| 1250° C. | 0.53 |
| 1300° C. | 0.43 |

EXAMPLE 4

Control experiments were conducted by processing 1100 aluminum as described in the above Examples but without the application of an external dopant. Negligible growth of the desired alpha-alumina ceramic material was observed at set-point temperatures between 1100° and 1350° C.

EXAMPLE 5

Additional experiments were conducted substantially as described in Example 1, but with external application of one gram of magnesium oxide and two and one-half grams of tin oxide to the exposed surface. Weight gain ratio data for such use of tin oxide as a dopant are tabulated in Table 5A below. Similarly, experiments were performed with external application of one gram of magnesium oxide, followed by 1.7 grams of germanium dioxide as the dopant material. Weight gain ratio data for such use of germanium dioxide as a dopant are tabulated in Table 5B.

TABLE 5A

Weight Gain Ratios at Various Setpoint Temperatures (Magnesium Oxide, Plus Tin Oxide)

| Setpoint Temperature | Weight Gain Ratio |
|---|---|
| 1150° C. | 0.02 |
| 1200° C. | 0.78 |
| 1225° C. | 0.80 |
| 1250° C. | 0.83 |
| 1275° C. | 0.81 |
| 1300° C. | 0.77 |
| 1350° C. | 0.45 |

TABLE 5B

Weight Gain Ratios at Various Setpoint Temperatures (Magnesium Oxide, Plus Germanium Oxide)

| Setpoint Temperature | Weight Gain Ratio |
|---|---|
| 1200° C. | 0.77 |
| 1250° C. | 0.50 |

The data of Tables 5A and 5B demonstrates the effectiveness of, respectively, tin oxide and germanium oxide, in combination with magnesium oxide, as dopants for an aluminum-based parent metal with air as the oxidant in the practice of the invention.

EXAMPLE 6

Experiments were conducted in a manner substantially as described in Example 1, but with the application of two grams of magnesium aluminate spinel ($MgAl_2O_4$) and one gram of silicon dioxide as dopant materials to the surface of the parent metal sheet. These dopant amounts correspond to 0.003 gram of Mg per square centimeter of exposed surface and 0.00086 gram of Mg per gram of parent metal. For these experiments, the furnace time at setpoint temperature was 36 hours. Weight gain data are tabulated in Table 6.

TABLE 6

Weight Gain Ratios at Various Setpoint Temperatures (Magnesium Aluminate Spinel and Silicon Dioxide as the Dopant Materials)

| Setpoint Temperature | Weight Gain Ratios |
| --- | --- |
| 1100° C. | 0.00 |
| 1125° C. | 0.01 |
| 1175° C. | 0.29 |
| 1225° C. | 0.22 |
| 1275° C. | 0.15 |
| 1325° C. | 0.20 |
| 1375° C. | 0.09 |

This Example demonstrates that dopant-containing compounds other than simple oxides may be effective in promoting ceramic growth.

EXAMPLE 7

To demonstrate the use of one externally applied dopant material in combination with another dopant material which is internally alloyed with the parent metal, six aluminum/magnesium alloys having between 0.5 and 10% by weight alloyed magnesium were processed with externally applied silicon dioxide over a range of setpoint temperatures.

In each trial, cylindrical ingots of 99.7% aluminum one inch long and one inch in diameter were cast from a melt at 850° C. Different quantities of magnesium were included in the various melts as specified below in order to provide different proportions of magnesium alloyed with the aluminum. The cast ingot cylinders were respectively embedded in El Alundum aluminum oxide refractory particles of 90 mesh grain size within a suitable refractory crucible. An end face of each ingot was exposed and was placed substantially flush to the surface of the bed of El Alundum particles. Upon this exposed surface of the ingot 0.05 grams of silicon dioxide in the form of −140 mesh powder was distributed in order to provide a second dopant material. For each of these trials the nominal furnace cycle was as follows:

| Elapsed Time (Period) | Temperature |
| --- | --- |
| 0–4 hours (4 hours) | From 30° C. to Setpoint |
| 4–16 hours (12 hours) | At setpoint temperature |
| 16–20 hours (4 hours) | From setpoint to 600° C. |
| 20+ hours | Removed from furnace |

For each aluminum or aluminum/magnesium alloy ingot tested, the weight gain ratio was determined in the manner described above with respect to Example 1. The results at various setpoint temperatures are tabulated in Table 7.

TABLE 7

Weight Gain Ratios At Various Setpoint Temperatures ("S.T.") Of Al/Mg Alloys With SiO$_2$ Applied To The Surface

| S.T.°C. | Mg Content | | | | | | | |
| --- | --- | --- | --- | --- | --- | --- | --- | --- |
| | 0% | 0.5% | 1% | 2% | 2.5%* | 3% | 5% | 10% |
| 1100 | — | 0.05 | 0.05 | 0.02 | 0.05 | 0.12 | 0.11 | 0.03 |
| 1150 | 0.004 | 0.14 | 0.09 | 0.13 | 0.13 | 0.13 | 0.09 | 0.21 |
| 1200 | 0.004 | 0.22 | 0.19 | 0.26 | 0.22 | 0.21 | 0.25 | 0.52 |
| 1250 | 0.002 | 0.15 | 0.76 | 0.25 | 0.79 | 0.72 | 0.79 | 0.72 |
| 1300 | 0.01 | 0.47 | 0.30 | 0.42 | 0.62 | 0.33 | 0.47 | 0.68 |
| 1350 | 0.01 | 0.32 | 0.17 | 0.06 | 0.06 | 0.09 | 0.05 | 0.57 |

TABLE 7-continued

Weight Gain Ratios At Various Setpoint Temperatures ("S.T.") Of Al/Mg Alloys With SiO$_2$ Applied To The Surface

| S.T.°C. | Mg Content | | | | | | | |
| --- | --- | --- | --- | --- | --- | --- | --- | --- |
| | 0% | 0.5% | 1% | 2% | 2.5%* | 3% | 5% | 10% |
| 1400 | — | 0.06 | 0.11 | 0.10 | 0.10 | 0.13 | 0.23 | 0.46 |

*The 2.5% magnesium alloy was provided by using a commercially available 5052 aluminum alloy.

These results demonstrate the utility of a binary dopant system with one dopant alloyed with the parent metal and the second applied externally to the surface of the parent metal.

EXAMPLE 8

In order to prepare a larger monolithic sample of the ceramic body of the present invention, a group of four plates of 5052 aluminum alloy (which nominally contains 2.5% magnesium), each plate measuring nine inches by eight inches by one-half inch, were stacked as an assembly two inches high, and weighing 6,500 grams. The bottom and sides of the stacked assembly were wrapped in household aluminum foil (which contains less than 0.5% by weight internal dopants) and embedded in a bed of El Alundum refractory granular material of 90 mesh size. The bed of granular material was confined within a suitable refractory vessel. The uppermost eight inch by nine inch plate surface of the stack was left bare of the aluminum foil, and twelve grams of silicon dioxide dispersed in a solution of polyvinyl alcohol and water was applied to the exposed plate surface, after which four grams of the powdered silicon dioxide material of mesh size −140 was applied to the plate surface. The resultant assembly was heated at a setpoint temperature of 1125° C. for 160 hours after allowing ten hours for the furnace to achieve setpoint temperature, and allowing twenty hours for cooling after the 160 hour heating period, before removal of the load from the furnace. After processing, the weight gain ratio was approximately 0.40. A section of the resulting monolithic ceramic body, which measured roughly ten inches by nine inches by one inch, is illustrated in FIG. 1.

EXAMPLE 9

Figure 2:
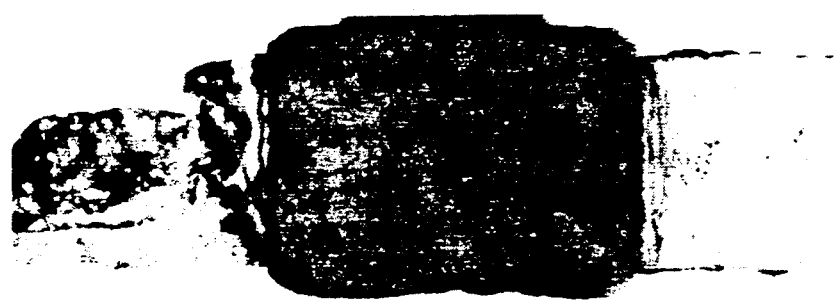
FIG. 2 is a photograph showing a top view of a ceramic body produced in accordance with Example 9 of this application.

To determine the effect that localized surface application of the dopant (leaving the remainder of the surface bare of the applied dopant material) had with respect to formation of the ceramic body, a sample was processed in the manner described in Example 8, except that a nine inch by two inch by one-half inch plate of commercially available 5052 aluminum alloy was used as the parent metal. Approximately 2.0 grams of silicon dioxide dispersed in a polyvinyl alcohol and water solution was applied to a three inch by two inch center portion of the nine inch by two inch exposed face of the plate to serve as the dopant. The sample was heated at a setpoint temperature of 1125° C. for 48 hours, after allowing five hours for the furnace to reach process temperature and five hours, after the 48 hour heating period, for the material to cool for removal from the furnace. The weight gain ratio was 0.16 and the resulting ceramic body, which grew predominantly from the externally doped surface area portion of the parent metal, is shown in FIG. 2.

EXAMPLE 10

A test was conducted in order to determine the effect of external application of the dopant in a non-powdered form. A sample of the commercially available 5052 aluminum alloy used in Examples 8 and 9 was prepared for processing in the manner described in Example 9. A solid sheet of silicon dioxide glass weighing eight grams and measuring one millimeter thick by two inches wide by three inches long was placed in the center region of the two inch by nine inch exposed surface of the plate of parent metal. Heating was carried out at a setpoint temperature of 1125° C. for 48 hours, after allowing five hours for the furnace to reach setpoint temperature and allowing five hours after the 48 hour heating period for the material to cool for removal from the furnace. The weight gain ratio was 0.12 with the growth of the ceramic body confined to the center region of the parent metal which was overlaid by the sheet of solid silicon dioxide, showing that the precise form of the dopant can be relatively unimportant.

EXAMPLE 11

Figure 3:
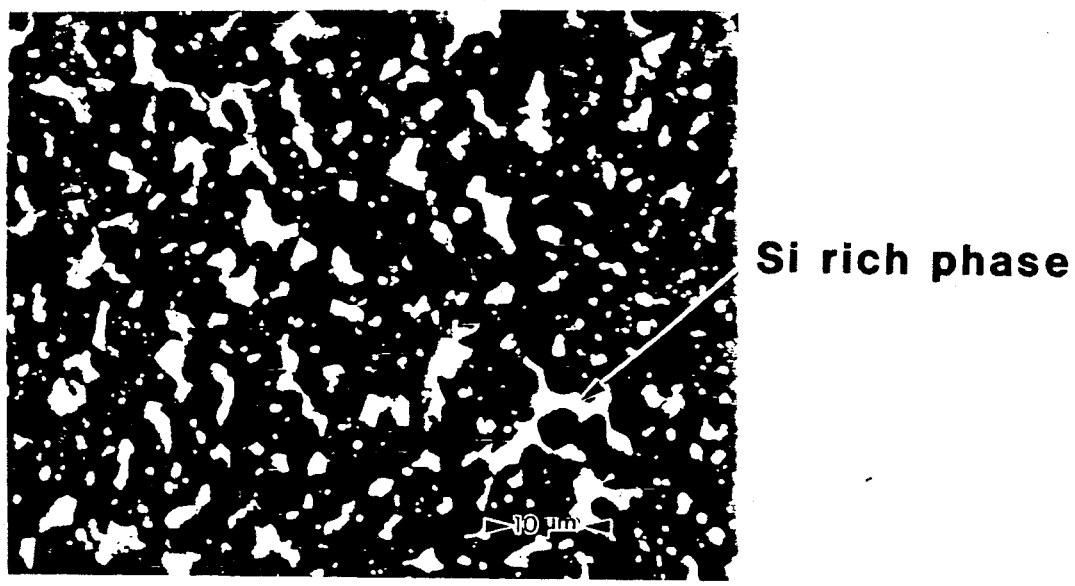
FIG. 3 is a photomicrograph showing the microstructure of a ceramic body produced in accordance with Example 11 of this application.

A test was conducted in order to determine the effect of a large amount of silicon dioxode dopant in the formation of the ceramic body of the present invention. Two sample plates, each measuring two inches by nine inches by one-half inch, of a commercially available 6061 aluminum alloy which nominally has 1% magnesium and 0.6% silicon were stacked to provide a one inch thick assembly and were embedded in the same refractory grain material used in Example 1 and contained in a suitable refractory vessel A two inch by nine inch surface of the top plate of the stack was left exposed. One gram of $-140$ mesh size particles of silicon dioxide dopant bonded with polyvinyl alcohol was coated onto the exposed two inch by nine inch surface, and an additional sixty-five grams of powdered silica (Newport No. 1 dry) was applied in a one-quarter inch thick layer over this surface, which otherwise remained exposed to the furnace atmosphere during processing. After processing at 1310° C. for 72 hours, first allowing five hours for the furnace to reach setpoint temperature and then ten hours after the heating period for the sample to cool for removal from the furnace, the weight gain ratio was 0.25, and growth was substantially confined to the doped surface. This indicates significant growth of the desired ceramic body in the presence of a large amount of the silicon dioxide dopant. The microstructure of the resulting polycrystalline material was as shown in FIG. 3. The metallic phase of the resulting material was highly enriched with elemental silicon, as indicated in FIG. 3. The polycrystalline oxidation reaction product grew to beyond the one-quarter inch depth of the silicon dioxide layer, indicating the relative insensitivity of the process to excess amounts of dopant.

EXAMPLE 12

In order to determine the effect of small quantities of externally applied dopant on the growth of the ceramic body of the present invention, experiments were performed in the manner of Example 9 using as the externally applied dopant material silicon dioxide in amounts in the range zero grams to 1.0 grams applied in finely divided powdered form to the surface of two inch by nine inch by one-half inch thick samples of a commercially available 5052 aluminum alloy (which nominally contains 2.5% of magnesium). The furnace setpoint was 1125° C. and processing time was 48 hours at setpoint, first allowing five hours for the furnace to reach setpoint temperature and then five hours after the heating period for the material to cool for removal from the furnace. Weight gain ratio was negligible (0.015) for a sample with no silicon dioxide applied to the surface, and was 0.16 to 0.36 for samples processed with 0.025 to 0.5 grams of externally applied silicon dioxide dopant, indicating that very small quantities (i.e., 0.0001 gram of silicon per square centimeter of exposed parent metal surface or 0.00003 gram of silicon per gram of parent metal) of the external dopant can be effective, although some threshold level of dopant (which can depend upon such factors as dopant materials, parent metal, oxidant, and processing conditions) may be required to obtain desirably rapid growth rates.

EXAMPLE 13

In order to demonstrate the use of zinc oxide and magnesium oxide as surface dopant materials the following tests were run. Aluminum of nominal 99.7% purity (containing iron and silicon as the primary impurities) was alloyed with either silicon, magnesium or zinc, and cast into cylinders of seven-eighths (⅞) inch diameter, which were cut into one inch lengths. The amounts of alloying metals used are shown in Table 13 below.

Each aluminum alloy cylinder tested was embedded in a bed of El Alundum aluminum oxide refractory particles of 90 mesh size contained in a suitable refractory vessel. A cut, circular surface of the cylinder was left exposed and substantially flush with the top of the bed of El Alundum particles. The tests were conducted with the different alloys with and without zinc oxide or magnesium oxide powder in the amounts indicated in Table 13, distributed as an externally applied dopant material on the exposed ⅞ inch diameter circular face of the embedded cylinder.

For each trial, the nominal cycle in a furnace configured to allow entry of atmospheric air as the oxidant was as follows:

| Elapsed Time (Period) | Temperature |
| --- | --- |
| 0–4 hours (4 hours) | From 30° C. to setpoint temp. |
| 4–52 hours (48 hours) | At setpoint temperature |
| 52–56 hours (4 hours) | From setpoint to about 600° C. |
| 56+ hours | Removed from furnace |

For each aluminum/silicon or aluminum/magnesium alloy tested, the weight gain was determined by weighing the loaded refractory vessel before and after the furnace cycle and calculating weight gain as a percentage of the original weight of the aluminum alloy parent metal cylinder. As noted above with respect to Example 1, the weight gains indicate the yield of alpha-alumina obtained by oxidation of aluminum, uncorrected for minor amounts, if any, of spinel in the initiation layer, alumina formation by reduction of dopant compounds, and small weight changes due to differences in adsorbed moisture on bed materials. In this Example and in the subsequent Examples however, the weight gain is calculated as percent by weight of the unoxidized alloy ingot. Thus, a weight gain of 50 grams per 100 grams of the parent metal ingot would be reported as a 50 in Table 13, whereas in previous Examples the same result would be given as 0.50. The results of the tests at various setpoint temperatures are tabulated in Table 13.

TABLE 13

Percent Weight Gains At Various Setpoint Temperatures ("S.T.") Of Alloys Of Nominal 99.7% Aluminum With And Without External Dopant

| Alloying Metal: | 10% Si | 10% Si | 3% Mg |
|---|---|---|---|
| External Dopant: | 200 mg ZnO | 0 | 200 mg ZnO |
| S.T. °C. | | Percent Weight Gain | |
| 1125 | 71.73 | −0.07 | 51.44 |
| 1250 | 49.67 | 1.07 | 49.01 |
| 1310 | 14.31 | 1.41 | 45.76 |
| Alloying Metal: | 3% Mg | 2% Zn | |
| External Dopant: | 0 | 100 mg MgO | |
| S.T. °C. | | Percent Weight Gain | |
| 1125 | 3.11 | 3.92 | |
| 1250 | 15.3 | 68.08 | |
| 1310 | 9.5 | 63.97 | |

The results of Table 13 show significant weight gains attributable to the formation of alpha-alumina and concomitant significant growth of the ceramic body, whether a source of magnesium or a source of zinc was utilized as the external dopant material in combination with an internal dopant. When the internal dopants silicon or magnesium were used alone (no external dopant), no or very little weight gain and growth was attained.

EXAMPLE 14

In order to test sodium oxide, lithium oxide and lanthanum oxide as externally applied dopant materials, a series of plates of 5052 aluminum alloy (which nominally contains 2.5% magnesium) was tested by embedding each plate, which measures nine inches by two inches by one-half inch, in a bed of the Alundum particles of Example 13 with a nine inch by two inch surface exposed and substantially flush with the bed of Alundum particles. The heating cycle of Example 13 was used except that the period at setpoint temperature was increased to 72 hours. An amount of the external dopant particles as specified in Table 14 was distributed over the exposed surface of each plate. The results obtained at various setpoint temperatures are set forth in Table 14, expressed in percent weight gain as in Example 13.

TABLE 14

Percent Weight Gains At Various Setpoint Temperatures ("S.T.") Of 5052 Aluminum Alloy Plates With Different External Dopants (g = grams)

| External Dopant: | *2-3 g Na₂O | *2-3 g Li₂O | 2-3 g La₂O₃ |
|---|---|---|---|
| S.T.°C. | | Percent Weight Gains | |
| 900 | — | 35.75 | — |
| 1000 | — | 21.59 | — |
| 1125 | 60.29 | — | 43.3 |
| 1250 | 20.15 | 31.9 | 56.68 |
| 1310 | 21.18 | 18.09 | 12.97 |

*Weights are approximate because of hydrolysis during handling of these materials.

Significant weight gains showing oxidation of aluminum to alpha-alumina are indicated by the results of Table 14, from which it is seen that the oxides of sodium, lithium and lanthanum are effective dopants (at least in combination with magnesium in parent alloy) for growth of ceramic material.

EXAMPLE 15

To determine the effect of lanthanum chloride as a surface applied dopant material on the growth of alpha-alumina ceramic, commercially available 5052 aluminum alloy two inches wide by nine inches long by approximately ½ inch thick was embedded in a bed of aluminum oxide (El Alundum, 90 mesh) with the nine inch face of the sheet exposed and substantially flush with the surface of the bed. The exposed surface of the sample was covered with 2.17 grams of anhydrous lanthanum chloride as to uniformly cover the surface. The embedded metal covered with the dopant material was heated in air for 48 hours at an 1125° C. setpoint temperature.

The weight gain included the yield of alpha-alumina obtained by oxidation of aluminum and was not corrected for other minor sources of weight change as described previously. The percent weight gain was 26.5.

This Example illustrates the use of lanthanum chloride as an externally applied dopant to promote the oxidation of aluminum to alpha-alumina and also illustrates that sources of dopants other than oxides may be used.

EXAMPLE 16

To determine the effect of yttrium oxide as a surface-applied external dopant material in the growth of an alpha-alumina ceramic from aluminum, three samples of commercially available 5052 aluminum alloy nine inches long by two inches wide by one half inch thick were embedded in separate beds of aluminum oxide (El Alundum, 90 mesh) in refractory crucibles such that a nine inch by two inch surface of the metal was exposed and flush with the surface of the bed. The samples were covered with 2-3 grams of yttrium oxide as an external dopant. The three externally doped samples were each heated to a separate process temperature for 72 hours in an air atmosphere. The process temperatures ranged from 1125° C. to 1310° C. The conversions of aluminum to alpha-alumina oxidation reaction product are presented in Table 16 below.

TABLE 16

| Process Temperature | % Conversion |
|---|---|
| 1125° C. | 11.6 |
| 1250° C. | 24.4 |
| 1310° C. | 8.5 |

This Example illustrates that yttrium oxide, employed as an external dopant, promotes significant conversion of the metal to oxidation reaction product, alpha-alumina, particularly at the 1250° C. process temperature.

EXAMPLE 17

To determine the effect of neodymium oxide and praseodymium oxide as surface-applied external dopant materials in the growth of an alpha-alumina ceramic from aluminum, four cylindrical ingots of 5052 aluminum one inch long by ⅜ inch diameter were embedded in separate beds of aluminum oxide (El Alundum, 90 mesh) in refractory crucibles such that the ⅜ inch diameter circular metal surface was exposed and flush with the surface of the bedding. The exposed surfaces of the ingots were covered with an external dopant material, specifically 0.2 g of silicon dioxide on one sample ingot, 0.2 g of neodymium oxide on another sample ingot and 0.2 g of praseodymium oxide on a third sample ingot. The fourth sample ingot was untreated for an experimental control. Oxidation of the samples was carried out at three separate process temperatures for 48 hours in air.

The percent conversion of the parent 5052 aluminum to alpha-alumina for each of the process conditions is listed in TABLE 17 below.

TABLE 17

| External dopant material | Setpoint temperature | % Conversion |
|---|---|---|
| None | 1125° C. | 3.0 |
| Silicon dioxide | 1125° C. | 33.2 |
| Neodymium oxide | 1125° C. | 62.0 |
| Praseodymium oxide | 1125° C. | 84.7 |
| None | 1250° C. | 9.6 |
| Silicon dioxide | 1250° C. | 31.8 |
| Neodymium oxide | 1250° C. | 22.5 |
| Praseodymium oxide | 1250° C. | 21.3 |
| None | 1310° C. | 18.8 |
| Silicon dioxide | 1310° C. | 69.8 |
| Neodymium oxide | 1310° C. | 19.3 |
| Praseodymium oxide | 1310° C. | 16.0 |

This Example illustrates the efficacy of neodymium oxide and praseodymium oxide applied as external dopant materials to promote growth of alpha-alumina ceramic.

EXAMPLE 18

To determine the effect of samarium oxide as a surface-applied external dopant material on the growth of alpha-alumina ceramic from aluminum, three cylindrical ingots of 5052 aluminum alloy one inch long by ⅞ inch diameter were embedded in separate beds of aluminum oxide (El Alundum, 90 crucibles such that the ⅞ diameter circular metal surface was exposed and flush with the surface of the bedding. To two of the samples, an external dopant material was applied, 0.2 g of silicon dioxide to one, and 0.2 g of samarium oxide to the other. The third was left untreated for experimental control purposes. The oxidation was carried out at the setpoint temperature for 48 hours in air.

The foregoing procedure was carried out at three separate setpoint temperatures ranging from 1125° C. to 1310° C. The percent conversions of the parent aluminum ingots to alpha-alumina at the respective reaction conditions are listed below in TABLE 18.

TABLE 18

| External dopant material | Setpoint temperature | % Conversion |
|---|---|---|
| None | 1125° C. | 4.86 |
| Silicon dioxide | 1125° C. | 79.5 |
| Samarium oxide | 1125° C. | 55.44 |
| None | 1250° C. | 12.32 |
| Silicon dioxide | 1250° C. | 31.06 |
| Samarium oxide | 1250° C. | 24.77 |
| None | 1310° C. | 15.56 |
| Silicon dioxide | 1310° C. | 35.93 |
| Samarium oxide | 1310° C. | 16.27 |

The tabulation above illustrates that samarium oxide as an external dopant material does substantially promote the oxidation of aluminum to alpha-alumina.

EXAMPLE 19

To determine the effect of cerium oxide as a surface-applied external dopant material on the growth of alpha-alumina ceramic from aluminum, four samples of commercially available 5052 aluminum alloy nine inches long by two inches wide by one-half inch thick were embedded in separate beds of aluminum oxide (El Alundum, 90 mesh) in refractory crucibles such that a nine inch by two inch surface of the metal was exposed and flush with the surface of the bed. Three samples were covered with 2-3 grams of cerium oxide as an external dopant and the fourth was left uncoated for control purposes. Each of the four samples was heated to the process temperature for 72 hours in an air atmosphere. The process temperatures ranged from 1125° C. to 1310° C. The conversions of aluminum to alpha-alumina oxidation reaction product are presented in TABLE 19 below.

TABLE 19

| Process Temperature | % Conversion |
|---|---|
| 1125° C. (control no dopant) | 7.83 |
| 1125° C. | 71.23 |
| 1250° C. | 23.0 |
| 1310° C. | 11.2 |

This Example illustrates that cerium oxide employed as an external dopant promotes significant conversion of the metal to the oxidation reaction product, alpha-alumina.

The foregoing Examples demonstrate specific instances of the utility of this invention in the preparation of ceramic bodies of the type described.

What is claimed is:

1. A self-supporting ceramic body comprising three-dimensionally interconnected ceramic matrix comprised predominantly of α-alumina, said α-alumina ceramic matrix comprising about 65-85 volume percent of said ceramic body, and three-dimensionally interconnected metallic phase comprised predominantly of aluminum, said metallic phase comprising about 15-35 volume percent of said ceramic body, said ceramic body being integrally attached to a growth installation surface comprising magnesium aluminate spinel, said growth initiation surface being located at least on one surface of said self-supporting ceramic body.

2. A self-supporting ceramic body comprising a three-dimensionally interconnected ceramic matrix consisting essentially of α-alumina and comprising about 65-85 volume percent of said ceramic body, and said ceramic matrix displaying a columnar macrostructure having a substantially hexagonal cellular pattern, said cellular pattern boundaries being substantially normal to the vertical axis of the columnar macrostructure, and a three-dimensionally interconnected metallic phase comprised predominantly of aluminum, said metallic phase comprising about 15-35 volume percent of said ceramic body, said ceramic body being integrally attached to a growth installation surface comprising magnesium aluminate spinel, said grow initiation surface being located at least on one surface of said self-supporting ceramic body.

3. A self-supporting ceramic body comprising an initial ceramic body and additional ceramic, said initial ceramic body comprising a three-dimensionally interconnected ceramic matrix, interconnected porosity and a metallic phase, said interconnected ceramic matrix comprising about 65-85 volume percent of said initial ceramic body, said interconnected porosity comprising about 10-20 volume percent of said initial ceramic body and said metallic phase comprising the remainder of said initial ceramic body, said additional ceramic being located on at least one exterior surface of said initial ceramic body, said additional ceramic comprising a three-dimensionally interconnected ceramic matrix and a three-dimensionally interconnected metallic phase.

* * * * *

UNITED STATES PATENT AND TRADEMARK OFFICE
CERTIFICATE OF CORRECTION

PATENT NO. : 5,073,527

DATED : December 17, 1991

INVENTOR(S) : Marc S. Newkirk, et al

It is certified that error appears in the above-indentified patent and that said Letters Patent is hereby corrected as shown below:

Column 4, line 37: after "metal" insert --to form a polycrystalline ceramic material--; delete "It should be understood that the resulting";

line 41: change "metal It" to --metal. It--.

Column 5, line 25: after "energy" insert --of the--.

Column 6, line 22: change "metal In" to --metal. In--;
line 62: change "vaporphase" to --vapor-phase--.

Column 7, line 31: change "(i.e., H" to --(i.e., $H_2/H_2O$--.

UNITED STATES PATENT AND TRADEMARK OFFICE
CERTIFICATE OF CORRECTION

PATENT NO. : 5,073,527
DATED : December 17, 1991
INVENTOR(S) : Marc S. Newkirk, et al It is certified that error appears in the above-indentified patent and that said Letters Patent is hereby corrected as shown below:

Column 10, line 65: after "applied" insert --to the parent metal surface, in accordance with the present invention. Additionally, dopants alloyed within the parent metal may be augmented by externally applied--;

lines 65-68: delete "For example, concentration dance with the present invention. Additionally, dopants alloyed within the parent metal may be augmented by externally applied dopants".

Column 23, line 31: after "90" insert --mesh) in refractory--.

Column 24, line 34: change "installation" to --initiation--;
line 51: change "grow" to --growth--.

Signed and Sealed this

Twenty-sixth Day of October, 1993

Attest:

BRUCE LEHMAN

Attesting Officer

Commissioner of Patents and Trademarks